United States Patent [19]

Ziomek et al.

[11] Patent Number: 4,842,300
[45] Date of Patent: Jun. 27, 1989

[54] VEHICLE AIR BAG MODULE WITH INTERNAL REINFORCING STRUCTURE

[75] Inventors: Joseph F. Ziomek, West Bloomfield; Joseph G. Dick, Mt. Clemens; George W. Goetz, Rochester Hills, all of Mich.

[73] Assignee: TRW Vehicle Safety Systems Inc., Romeo, Mich.

[21] Appl. No.: 177,482

[22] Filed: Apr. 1, 1988

[51] Int. Cl.$^4$ .................. B60R 21/16; B60R 21/10
[52] U.S. Cl. .................. 280/732; 280/743; 280/736
[58] Field of Search ............. 280/728, 732, 742, 743, 280/729, 730, 734, 740; 16/125

[56] References Cited

U.S. PATENT DOCUMENTS

| | | | |
|---|---|---|---|
| 2,997,165 | 8/1961 | Leuthy | 206/47 |
| 3,622,176 | 11/1971 | Byer | 180/90 |
| 3,640,546 | 2/1972 | Brown | 49/21 |
| 3,737,945 | 6/1973 | Gould | 16/125 |
| 3,801,127 | 4/1974 | Katter | 239/550 |
| 3,879,056 | 4/1975 | Kawashima et al. | 280/743 |
| 3,910,595 | 10/1975 | Katter | 280/150 AB |
| 4,111,457 | 9/1978 | Kob | 280/728 |
| 4,277,262 | 7/1981 | Miko | 55/278 |
| 4,290,627 | 9/1981 | Cumming | 280/729 |
| 4,400,010 | 8/1983 | Stutz et al. | 280/732 |
| 4,552,380 | 11/1985 | Stevens | 280/728 |

FOREIGN PATENT DOCUMENTS 76344  5/1983 Japan .................. 280/732

Primary Examiner—Charles A. Marmor
Assistant Examiner—Ross Weaver
Attorney, Agent, or Firm—Calfee, Halter & Griswold

[57] ABSTRACT

A structure and assembly technique for providing an internal reinforcement for an air bag module to restrain bulging of the module while minimizing the size of the module. The air bag module comprises a container with a wall defining a cavity for a gas generator and at least a part of an air bag. The wall also defines an opening through which at least part of the bag is inserted into the cavity. A reaction member, preferably a fabric tether strap, is connected with at least two points of the wall adjacent the container opening and extends across the opening in the container. The tether strap is located internally of the container and resists deformation of the container under the pressures of air bag deployment, without increasing the size of the module. The tether strap is preferably constructed as a part of the air bag itself, and is incorporated into the container at the time the air bag is assembled with the container. Moreover, the assembly process is designed to enable the bag to be folded into the container and around the tether strap, in a manner which is designed to promote effective deployment of the bag despite the incorporation of the tether strap internally relative to the container.

27 Claims, 10 Drawing Sheets

VEHICLE AIR BAG MODULE WITH INTERNAL REINFORCING STRUCTURE

TECHNICAL FIELD

The present invention relates to a vehicle air bag module with reinforcing structure designed to minimize deformation of the module during deployment of the air bag. Additionally, the present invention relates to an air bag module in which the reinforcing structure is internal to the module, thereby minimizing the package size of the module. Still further, the present invention relates to new and useful techniques for assembling the module.

BACKGROUND

A vehicle air bag module typically includes a container, which has an open side and encloses a gas generator and at least part of an air bag, and a cover which closes the container. When the air bag module is designed for the passenger side of a vehicle, the container may be located just behind the vehicle dashboard, and the cover may form an integral part of the vehicle dashboard.

When the vehicle is involved in a collision, a crash signal initiates operation of the gas generator to cause the air bag to deploy. Specifically, the gas generator produces an inert gas (e.g., nitrogen) which is directed under pressure against the air bag to force the air bag out of the container incorporated in the module and into the passenger compartment. As the air bag is forced out of the container, the pressure exerted on the cover causes selected portions of the cover to separate, in a predetermined manner, to enable the air bag to be directed into the passenger compartment. As the air bag is directed into the passenger compartment, it is inflated by the continued flow of gas produced by the gas generator.

During deployment of an air bag, the container, which is generally made of metal (e.g., steel sheet), must withstand significant pressures. More specifically, a passenger side gas generator when actuated, is believed to produce gas pressure of approximately 10-40 psi in the container. It has been found that under such pressure the central part of the module container, in the vicinity of its opening, may tend to bulge or "fishmouth" outward during deployment of the air bag. When the opening of the air bag container is located adjacent the vehicle dashboard, bulging of the central part of the container can crack (or deform) the dashboard, thereby requiring replacement of the entire dashboard.

A known technique for reinforcing the opening of a metal air bag container is to bend the metal located around the opening in an outward direction to reinforce the opening. One undesirable result of bending the metal around the container opening in an outward direction is that the container opening is enlarged. Enlarging the container opening also enlarges the module, which is undesirable in today's vehicles, where minimizing the dimensions of the module is an important criterion. Additionally, in the applicants' experience, bulging of the central part of the container is still possible even if the container is reinforced around the opening by bending the metal outward. Thus, there has been a need to address the problem of bulging or fishmouthing of the central part of the container around its opening, while minimizing the dimensions of the air bag module.

In addition, in assembling an air bag module, it is important that the air bag be folded into the container in a manner which allows the bag to be effectively deployed without risk of snagging or other interference. Accordingly, internal reinforcement of the container has heretofore been an unattractive alternative to designers of air bag modules.

SUMMARY OF THE INVENTION

The present invention provides a new and useful structure an air bag module to minimize bulging of the container while minimizing the outer dimensions of the module. Moreover, the invention includes a new and useful technique for assembling an air bag and an internal reinforcement into a module in a manner which enables the air bag to be effectively deployed without interference by the internal reinforcement.

According to one aspect of the invention, the air bag container includes a wall defining a cavity for receiving a gas generator and at least a part of an air bag. The wall also defines an opening through which at least part of the bag is inserted into the cavity. A reaction member, preferably an inelastic fabric tether strap, is connected the wall at two points on the inside perimeter of the container opening and extends across the opening. The tether strap, which is located internally of the container, restrains the container from bulging outward under the pressures of air bag deployment, without increasing the dimensions of the container or the module. Preferably, the tether strap is connected with the container near the central part of the container opening to apply forces to the part of the container where bulging would otherwise present the greatest problem.

The tether strap is also preferably constructed initially as a part of the air bag itself and is incorporated into the module at the time the air bag is assembled with the container. Such a construction simplifies the process of assembling the bag and the tether strap with the container.

The tether strap and the bag are assembled using a technique that enables the tether strap to be incorporated into the container and the air bag to be folded into the container and around the strap, such that the strap does not interfere with effective deployment of the air bag into the vehicle compartment. More specifically, as the air bag is folded around the tether strap and into the container, there is direct fluid communication between the gas generator and a distal segment of the air bag (i.e. the segment of the air bag which is thrust farthest into the vehicle compartment when the air bag deploys). When the gas generator is activated, the gas produced by the gas generator impinges immediately against the distal segment of the air bag, and forces that segment out of the module and into the vehicle compartment. The inflation gases also begin filling the air bag as the distal segment is being forced out of the module, which results in a particularly favorable distribution of forces on the vehicle occupant, especially when the occupant is a "standing child".

Further objects and advantages of the present invention will become apparent from the following detailed description and the accompanying drawings.

DETAILED DESCRIPTION OF THE PREFERRED EMBODIMENT

As described above, the present invention relates to an air bag module with an internal reinforcing structure and to a method for assembling the air bag module. The air bag module is designed to be incorporated into the passenger side of a vehicle with the cover of the module forming part of the dashboard of the vehicle.

Figure 1:
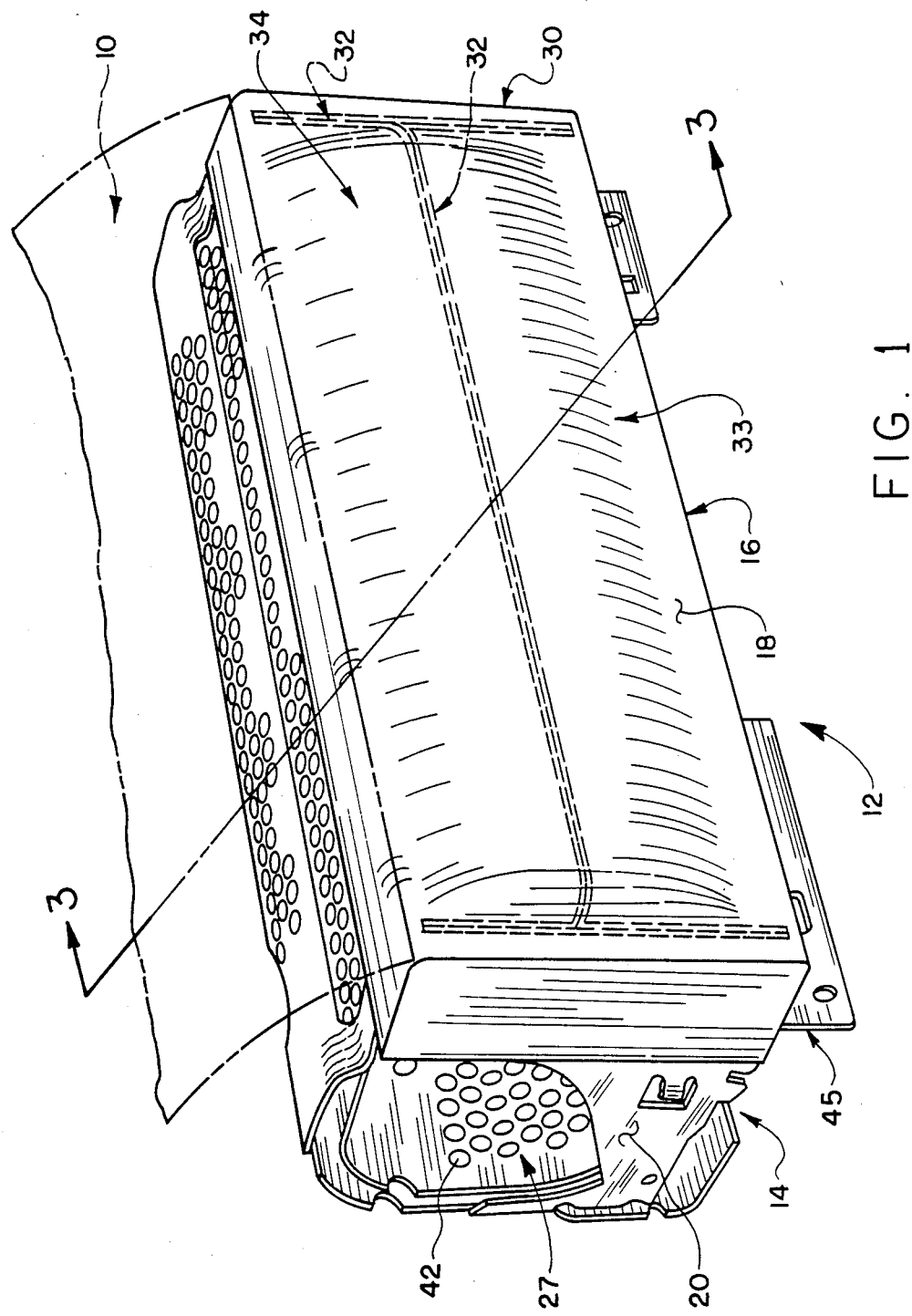
FIG. 1 is a perspective schematic illustration of the external profile of an air bag module constructed according to the present invention, with certain portions omitted.

In FIG. 1, an air bag module 12, constructed according to the present invention, is shown mounted in a vehicle dashboard 10. The module 12 includes a container 14 and a cover 16. The container 14 is located just behind the vehicle dashboard 10. The cover 16 has an outer surface 18 with a profile matching the outer profile of the dashboard 10. When the air bag module 12 is assembled into a vehicle, the cover 16 is effectively incorporated into and forms a part of the vehicle dashboard 10.

The container 14 is preferably made of sheet steel components. Walls 20 of the container 14 define a cavity 22 for receiving a cylindrical gas generator (shown schematically at 24 in FIGS. 2A, 2B) and a vehicle air bag 26. The walls 20 also define a side opening 27 (FIG. 1) for enabling insertion of the cylindrical gas generator 24 into the container 14 and a front opening 28 (FIGS. 2A, 2B) for enabling at least part of the air bag 26 to be inserted into the container 14, in a manner described more fully hereinafter. Thus, the container 14 encloses the gas generator 24 and at least part of the air bag 26 and stores those elements until a emergency condition arises.

Figure 3:
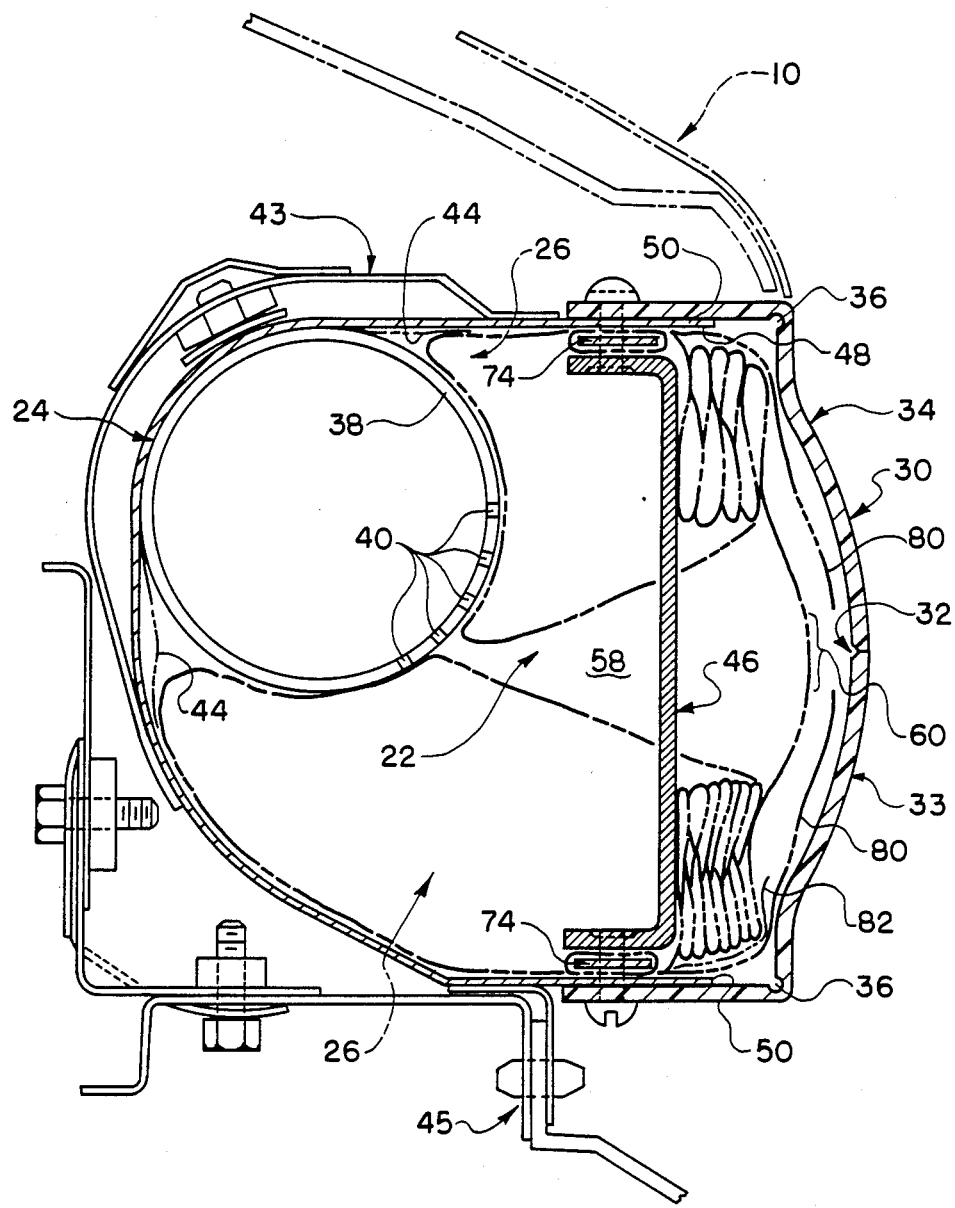
FIG. 3 is a sectional illustration of an air bag module constructed according to the principles of this invention, taken along the line 3—3 in FIG. 1 and illustrating the air bag and part of the vehicle dashboard schematically in phantom.

The cover 16 closes the opening 28 in the container 14. As seen in FIGS. 1 and 3, the cover 16 can be constructed as shown in U.S. Pat. No. 3,622,176. Specifically, the cover comprises a flexible plastic member 30 with an H-shaped parting configuration formed by a series of grooves 32 on its inside surface. The grooves 32 are V-shaped, and concentrate stresses to enable the cover to separate into a pair of flaps 33, 34 when pressure is applied to the inside of the cover 16. A pair of rounded grooves 36 are formed on the inside of the cover member 16 and extend horizontally along the top and bottom edges of the cover member 16 (see FIG. 3). The rounded grooves 36 distribute rather than concentrate stresses thereby enabling the flaps to pivot about horizontal axes defined by the rounded grooves 36.

In a collision, the gas generator 24 is activated, and an inert gas (e.g., nitrogen) is rapidly directed, under pressure, into the cavity 22. The gas causes the air bag 26 to be forced through the opening 28 in the container 14 and causes pressure to be applied to the inside of the cover 16. When such pressure is applied to the cover 16, the V-shaped grooves 32 enables the cover to separate into flaps 33, 34 to allow the air bag to be deployed into the vehicle compartment. Thus, the module cover 16 is designed to match the profile of the vehicle dashboard 10 and to separate into flaps to enable the air bag to be deployed in an emergency.

The gas generator 24 preferably has a cylindrical outer housing 38 with a plurality of nozzles 40 (FIGS. 2A, 2B, 3) for directing jets of an inert gas (e.g. nitrogen) rapidly into the cavity 22. The gas is generated by ignition of a solid chemical mixture disposed within the housing 38. The internal structure of the gas generator 24 forms no part of the present invention. The internal structure of the gas generator 24 can be any of a number of known constructions, including the construction illustrated in U.S. Pat. No. 4,696,705, which is a preferred construction.

The container 14 is designed to receive and support the cylindrical gas generator 24 in a manner well known in the art. The cylindrical gas generator 24 is inserted into the container 14 through the side opening 27 in one part of the wall 20 and engages a post 41 (FIG. 2) in an opposite part of the wall 20. The side opening 27 can then be closed by an end cap (not shown). The container 14 also contains aspirator holes 42 (FIG. 2) to enable air to be aspirated along with the inert gas as an inflating fluid. Aluminum flaps 44 (FIG. 3) between the gas generator housing 38 and selected portions of the wall 20 help control the aspiration of air into the container 14. A heat shield 43 (FIGS. 2, 3) located adjacent the gas generator 24 protects parts of the vehicle against damage from the heat generated when the gas generator 24 is actuated. A bracket 45 (FIGS. 1-3) attached to the exterior of the container enables the container to be mounted in the vehicle behind the dashboard 10. The general structure and function of aspirator holes, heat shields, flaps and brackets are all well known to those of ordinary skill in this art, and need not be described further herein.

Figure 2:
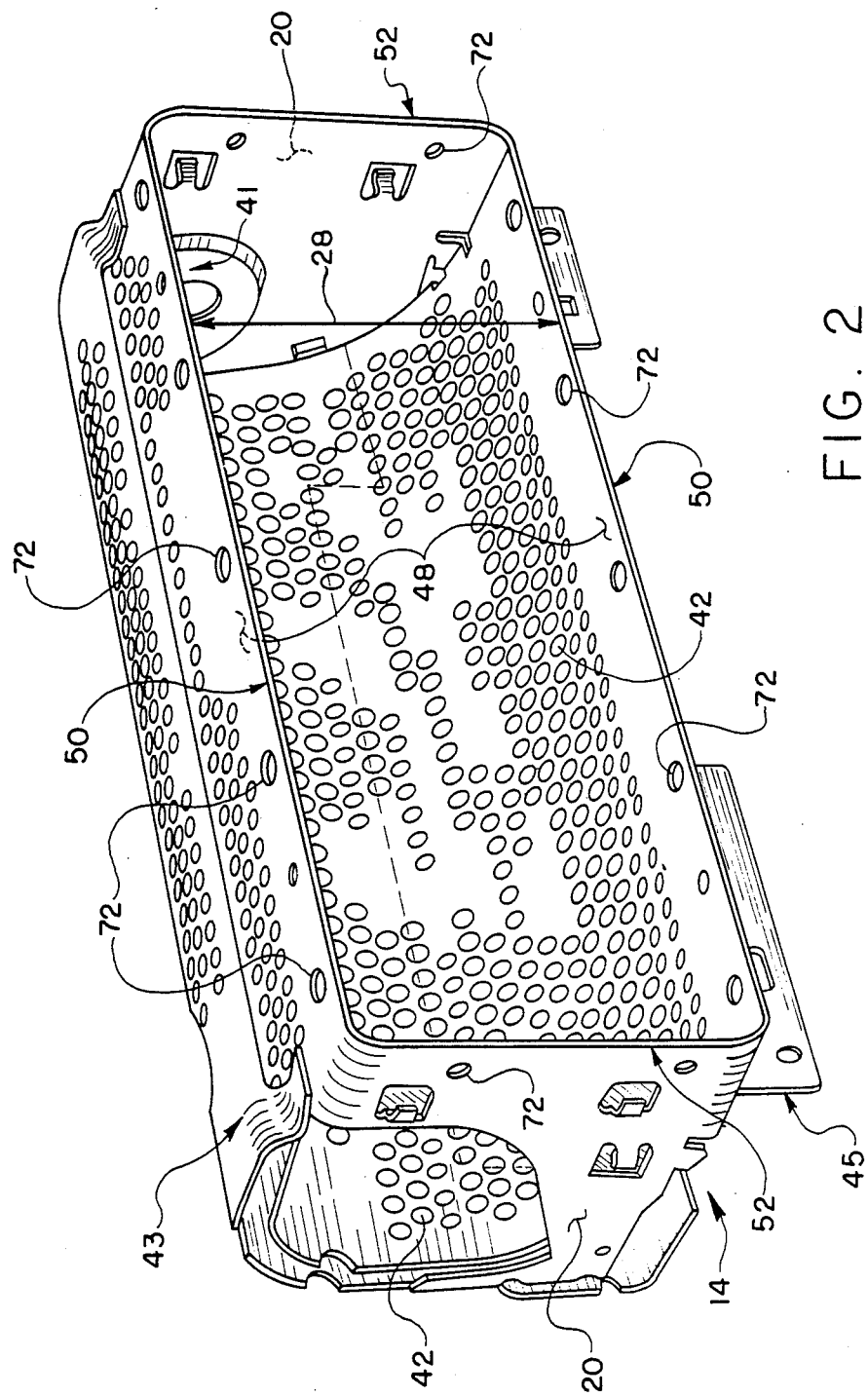
FIG. 2 is a schematic illustration of the container part of the air bag module of FIG. 1, with the tether strap and the air bag omitted.
Figure 2A:
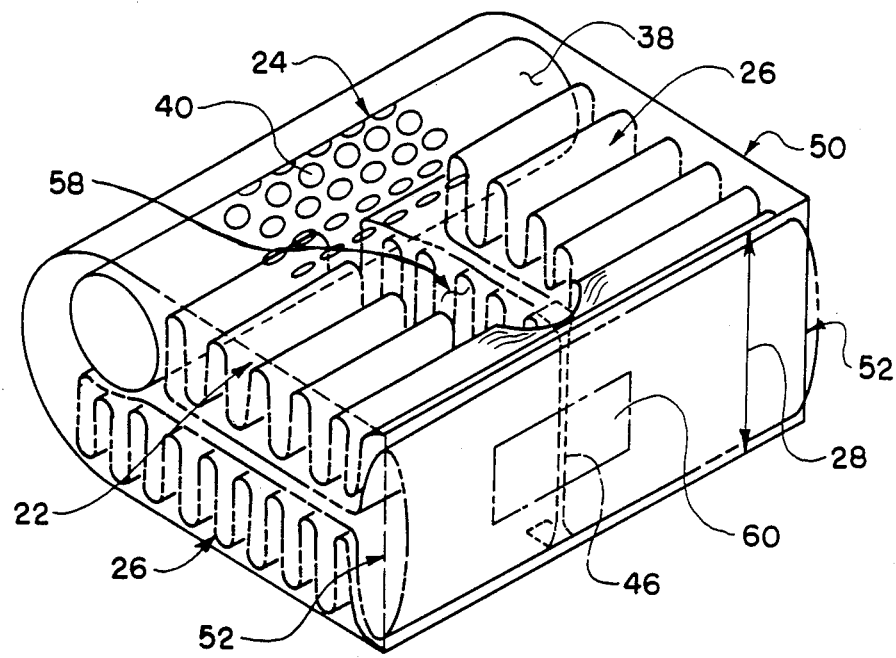
FIG. 2A is a schematic illustration of the container, with the air bag incorporated therein, and schematically illustrating the location of the distal segment of the air bag relative to the other components in the container.

The container opening 28 is preferably rectangular with parallel major sides 50 and parallel minor sides 52 (see FIGS. 2, 2A). A tether strap 46 extends across the opening 28 at or near the mid-points of the major sides 50 of the rectangular opening 28 (see FIGS. 2A, 2B). The tether strap 46 is preferably connected with the inside perimeter 48 of the wall 20 defining the opening 28 so that the strap 46 is completely internal to the container 14.

Figure 9:
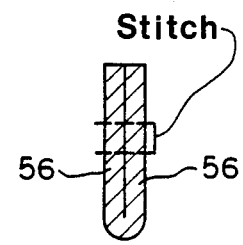
FIG. 9 is a fragmentary illustration of the air bag of FIG. 5, taken along the line 9—9 in FIG. 5.

The tether strap 46 is preferably formed of the same type of woven polyester that is conventionally used to form an automobile seat belt. Moreover, the tether strap 46 is substantially inelastic (i.e. inextensible) due to (i) the nature of the polyester and/or (ii) the woven pattern of the polyester. The opposite longitudinal ends of the tether strap 46 are sewn to the air bag 26 (see FIGS. 5, 7). The central portion 54 of the tether strap 46 is folded lengthwise into two halves 56 which are sewn to each other (see FIG. 9), to narrow the width of the tether strap 46 and to increase its tensile strength. During deployment of the air bag 26, the substantially inelastic tether strap 46 acts as a reaction member which resists forces that act on the container 14 adjacent the opening 28 and that tend to cause bulging of the central portion of the container under the pressures of air bag deployment.

Figure 2B:
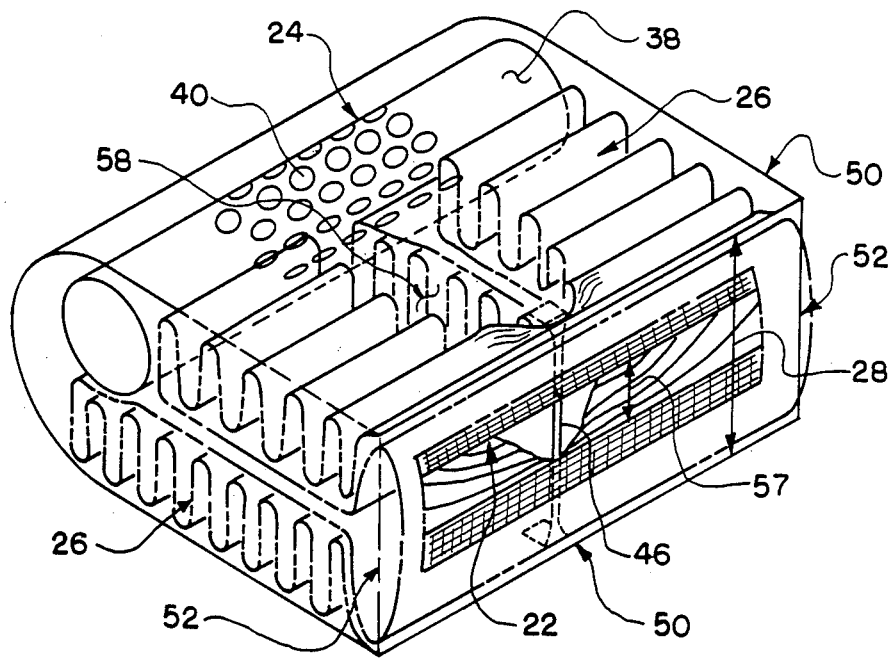
FIG. 2B is a schematic illustration of the container with the air bag incorporated therein, and the distal fabric segment omitted, and schematically illustrating the manner in which the air bag is disposed about the tether strap.

As seen in FIGS. 2A, 2B and 3, the air bag 26 is folded at least partially around the tether strap 46. The manner in which the air bag 26 is folded is designed, in accordance with the principles of this invention, to provide a central clear space 58 extending from the gas generator 24 to a distal segment 60 of the air bag which is located in front of and on opposite sides of the tether strap 46. Thus, the gas produced by the gas generator 24 impinges directly against the parts of the distal segment 60 of the air bag 26 on opposite sides of the tether strap 46. The pressure of the gas against the distal segment 60 of the air bag 26 drives the distal segment 60 through the container opening 28 and through the cover 16. Thus, the bag can be rapidly deployed and inflated without interference by the tether strap 46. The bag folding pattern, described more fully below, is specifically designed to enable the air bag 26 to be folded into the container 14 while establishing the central clear space 58 between the gas generator 24 and the distal segment 60 of the bag material.

The tether strap 46 is preferably incorporated into the air bag 26 before assembly of the air bag 26 with the container 14. More specifically, the air bag 26, when inflated, has a generally cylindrical shape with generally circular end panels 62 and a generally cylindrical intermediate panel 64 (see FIGS. 4, 5). The air bag 26 has a rectangular opening 66 corresponding in shape and approximate dimensions to the rectangular opening 28 in the container 14. The tether strap 46 extends across the rectangular bag opening 66, at or near the midway point along the length of the rectangular opening 66. The tether strap 46 is sewn to the air bag 26 in a manner which enables the strap 46 to be secured to the inner perimeter 48 of the container wall 20 by the same structure that connects the air bag material to the container wall 20, as described below.

Figure 5:
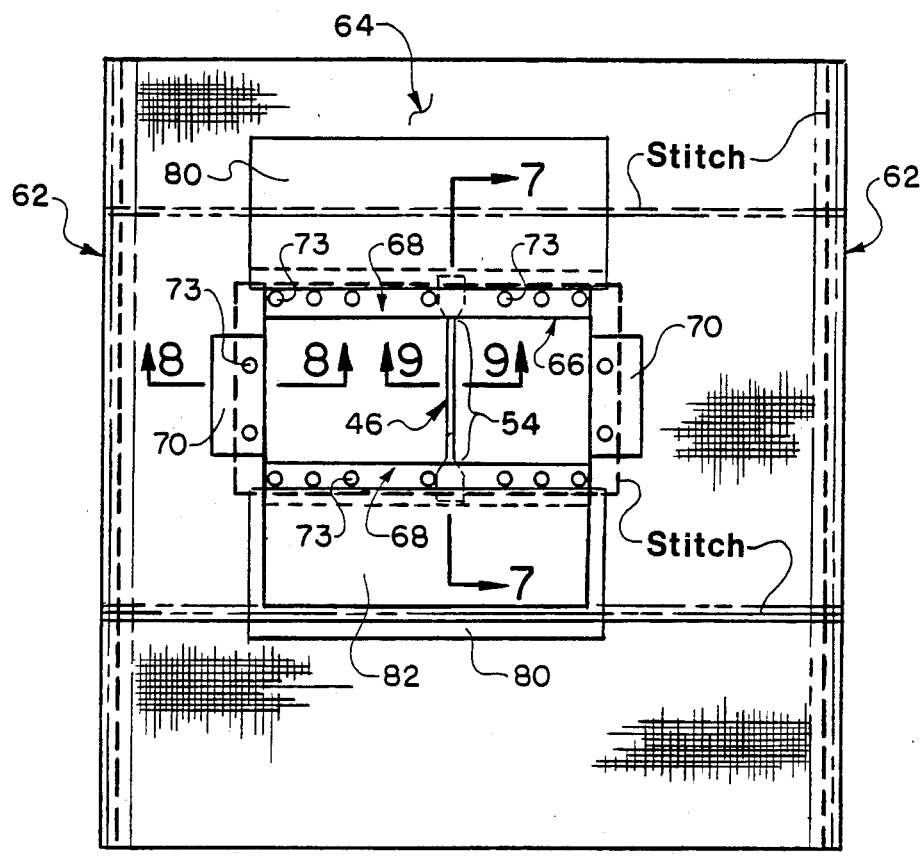
FIG. 5 is a front elevational view of an air bag according to the present invention, in an inflated condition, taken from the direction 5—5 in FIG. 4.
Figure 7:
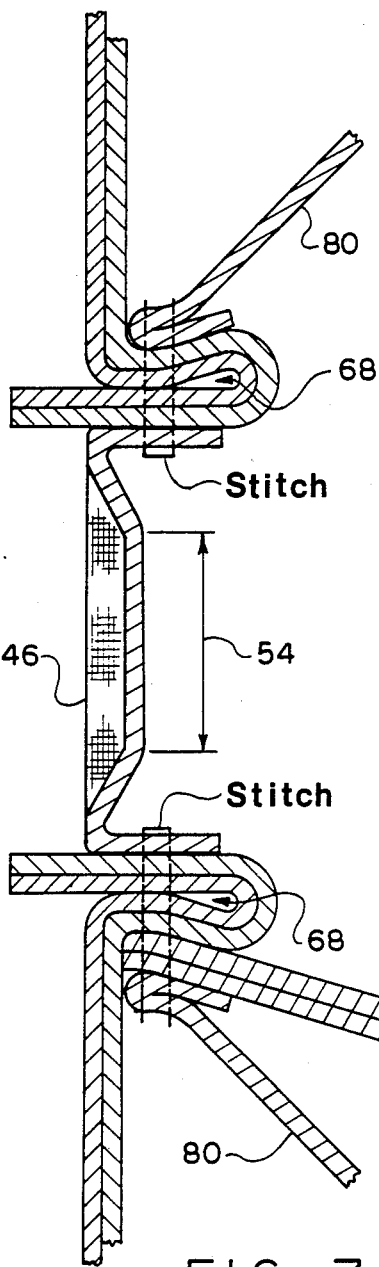
FIG. 7 is a fragmentary sectional view of the air bag of FIG. 5, taken along the line 7—7 in FIG. 5.

Along the longitudinal major sides of the rectangular opening 66 in the bag the air bag material, which is preferably nylon, is folded back on itself to form longitudinally extending loops or tubes 68 (see FIGS. 5, 7).

Figure 6:
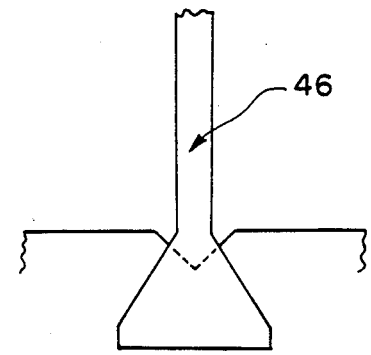
FIG. 6 is a fragmentary illustration of a portion of the air bag of FIG. 5.
Figure 8:
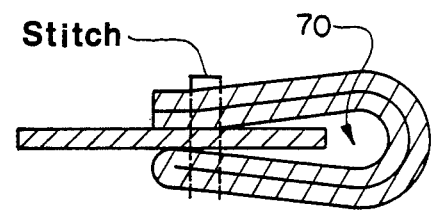
FIG. 8 is a fragmentary illustration of the air bag of FIG. 5, taken along the line 8—8 in FIG. 5.

Along the minor sides of the rectangular opening 66 in the bag the air bag material is also folded back on itself to form shorter loops or tubes 70 (See FIGS. 5, 8). The longitudinal ends of the tether strap 46 are sewn to the tubes 68 extending along the longitudinal major sides of the rectangular opening 66 in bag 26, in the manner illustrated in FIGS. 5 and 7. To locate the tether strap 46 properly for sewing to the bag, a pair of V-shaped slots (See FIG. 6) may be formed in the bag material. When the tether strap 46 has been sewn to the bag, and the bag has been properly inserted into the container 14, the tether strap 46 extends substantially perpendicular to the major sides 50 of the container opening 28 (see FIGS. 2A, 2B, 3).

The portion of the wall 20 defining the container opening 28 includes a series of bolt holes 72 at spaced locations around the perimeter of the opening 28 (FIG. 2). The tubes 68, 70 formed in the bag around the perimeter of the rectangular opening 66 include holes 73 (FIG. 5) designed to align with the bolt holes 72 in the container wall means 20. A long metal reinforcing bar 74 having a rectangular cross section, is inserted longitudinally into each of the longer tubes 68 of fabric along the longitudinal major sides 50 of the bag opening 66 (see FIG. 3). A shorter metal reinforcing bar (not shown) is inserted into the shorter tubes 70 along the shorter sides 52 of the rectangular bag opening 66. The sides of the metal reinforcing bars which face the inside perimeter 48 of the container wall means have internally threaded bolt openings (not shown) which are designed to align with the bolt holes 72 in the container wall 20 and with the holes 73 in the fabric tubes 68, 70.

During assembly of the bag 26 with the container 14, the reinforcing bars are inserted in their respective fabric tubes in the bag. Bolts are threaded into the openings in the bars to secure the fabric and the reinforcing bars to the inside perimeter of the container opening 28. When the air bag 26 is bolted to the container 14, in the manner described above, the tether strap 46 extends across the opening 28 in the container 14, at or near the midway point along the length of the rectangular opening 28 in the container 14.

Figure 4:
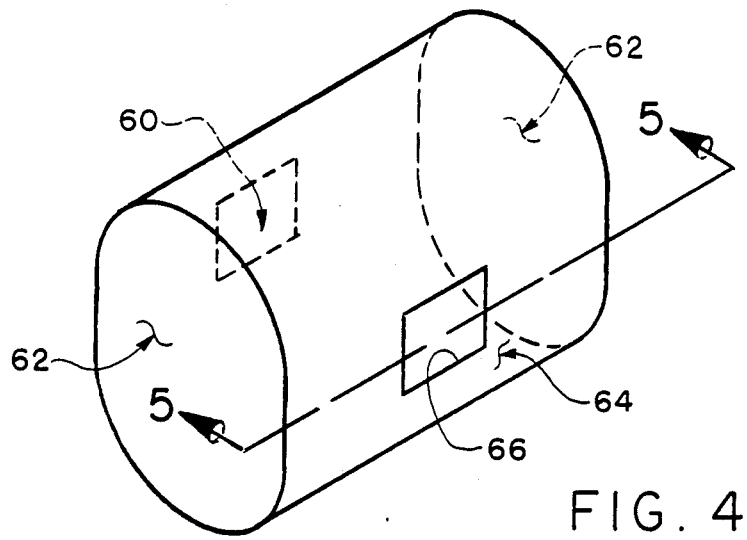
FIG. 4 is a schematic illustration of a fully inflated air bag used in a module according to the present invention.

In assembling the air bag 26 with the container 14, the air bag must be folded in such a manner that other than the tether strap 46 there is substantially unobstructed communication between the gas generator 24 and the distal fabric segment 60 of the air bag. As illustrated in FIG. 4, the distal fabric segment 60 of the air bag is located on the cylindrical central panel 64, diametrically opposite to the opening 66. Also, it should be noted that the air bag 26 has a pair of interference flaps 80 and an aspirator flap 82, both of which are made of fabric which is sewn to the bag material in the vicinity of the bag opening 66 (see FIGS. 5, 7).

The first step in assemblying the air bag 26 with the container 14 is to attach the air bag opening 66 to the part of the container opening 28. As discussed above, that entails inserting the metal reinforcing bars into the fabric tubes 68, 70 formed in the air bag 26, and bolting the metal reinforcing bars to the container 14 adjacent to the inside perimeter of the opening 28.

When the bag is bolted to the container, the air bag opening 66 and the tether strap 46 are located in the correct positions on the inside perimeter of the opening 28 in the container 14 Also, the interference flaps 80 and the aspirator flap 82 are located just outside the opening 28 in the container 14.

Figure 10:
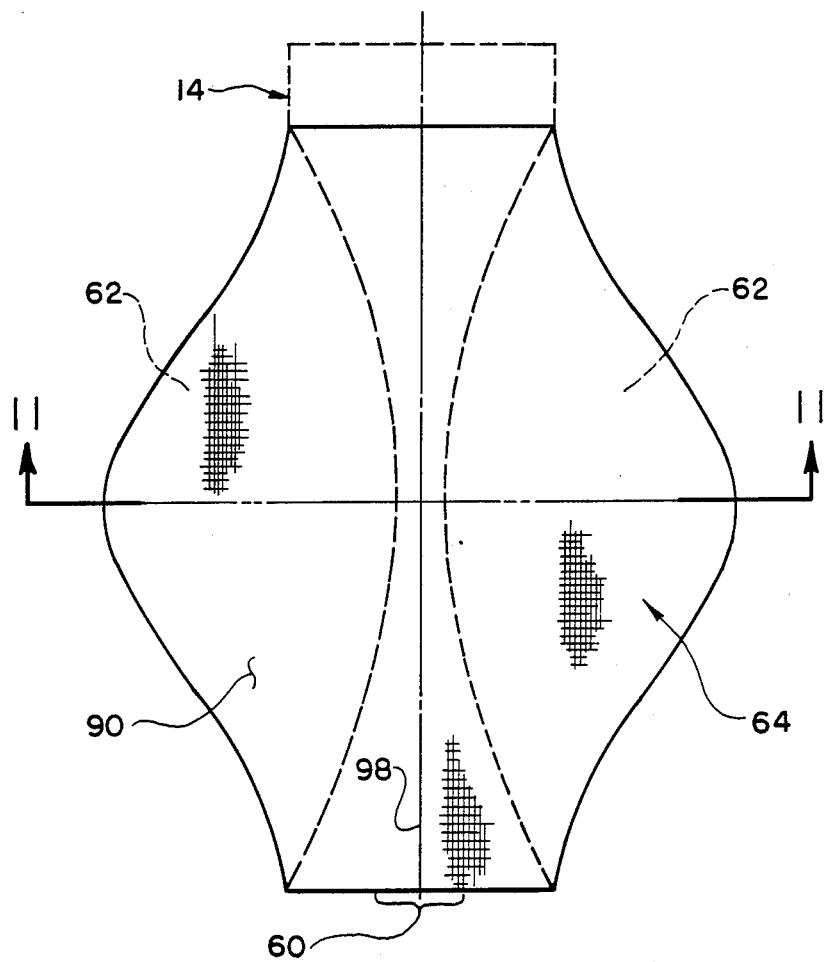
FIG. 10 is a schematic plan view of an air bag during an initial stage of preparation of the air bag prior to being folded into the container.
Figure 11:
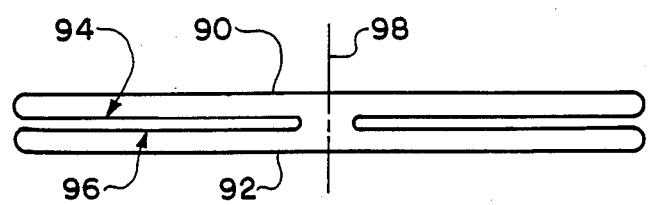
FIG. 11 is a sectional view of the air bag of FIG. 10, taken along the line 11—11 in FIG. 10.

After the air bag is bolted to the container opening 28, the air bag 26 is spread out in a direction away from the container 14 to flatten the intermediate panel 64 into a pair of outer fabric layers 90, 92. The circular end panels 62 are then folded into a pair of pleats 94, 96 and tucked between the fabric layers 90, 92. FIG. 10 is a top plan view of the fabric layer 90 when the bag is in that condition. The innermost portions of the pleats 94, 96 are spaced from each other and from a line 98 extending between the pleats from the center of the container to the center of the distal segment 60 of the bag (see FIGS. 10, 11).

Figure 12:
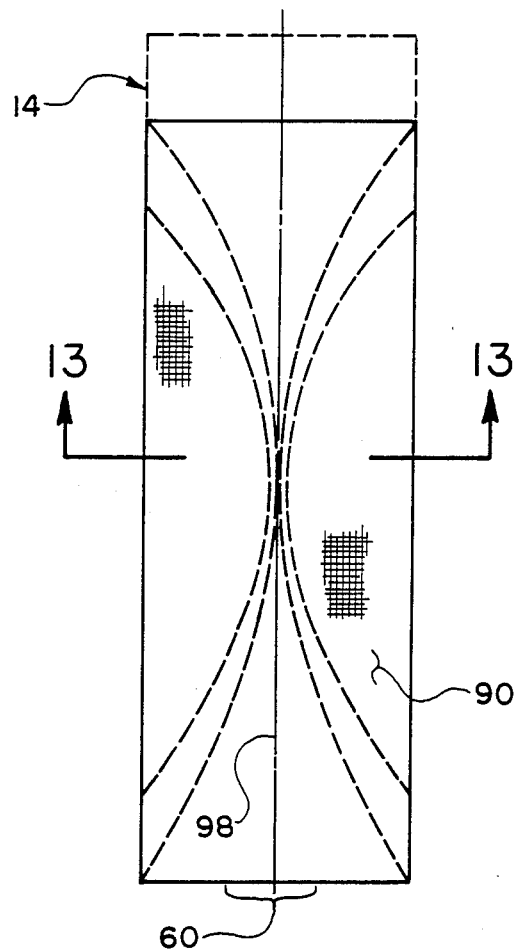
FIG. 12 is a schematic plan view of an air bag during a later stage of preparation prior to being folded into the container.
Figure 13:
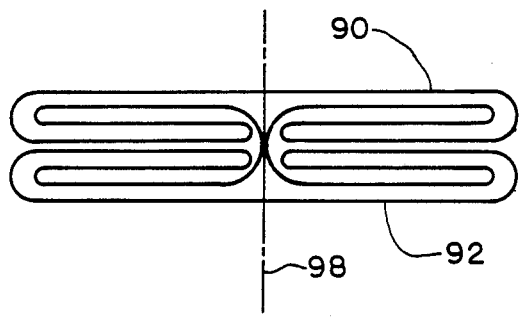
FIG. 13 is a sectional view of the air bag of FIG. 12, taken along the line 13—13 in FIG. 12.

The next step (see FIGS. 12, 13) is to fold the outer portions of the pleats toward the center line 98 to reduce the width of the outer fabric layers 90, 92 and to form two pleated sections between the outer fabric layers 90, 92. The innermost portions of the two pleated sections between the fabric layers 90, 92 may extend to the center line 98 but do not overlap each other. Thus, there are pleated sections between the outer fabric layers 90, 92, and those pleated sections are on opposite sides of the center line 98 (FIGS. 12, 13). Also, each of the outer fabric layers 90, 92 is now formed into a generally rectangular configuration whose width corresponds to the length of the rectangular opening 28 in the container (see FIG. 12). The distal segment 60 of the fabric still remains along the center line 98.

Figure 14:
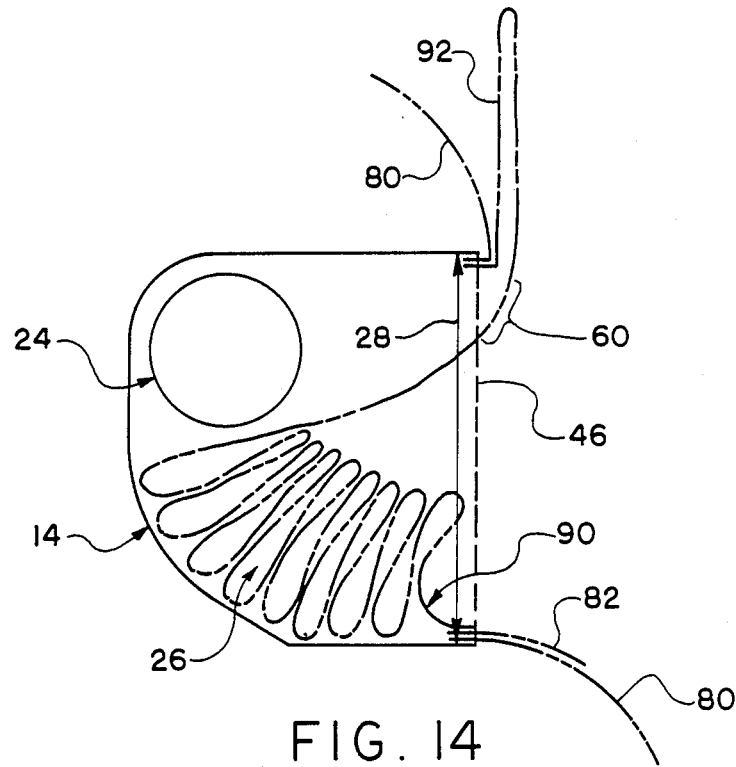
FIGS. 14-17 are schematic illustrations of the sequence of steps folding an air bag into a container, according to the principles of this invention.

The third step is to begin folding one of the outer rectangular fabric layers 90, 92 into the container 14. The layer 90 is folded into approximately eight folds starting from one of the major sides of the container (see FIG. 14). As the layer 90 is being folded into the container 14, the folds are continuously pushed toward that major side of the container opening, and the pleats 94, 96 are pushed into the container on opposite sides of the tether strap 46.

Figure 15:
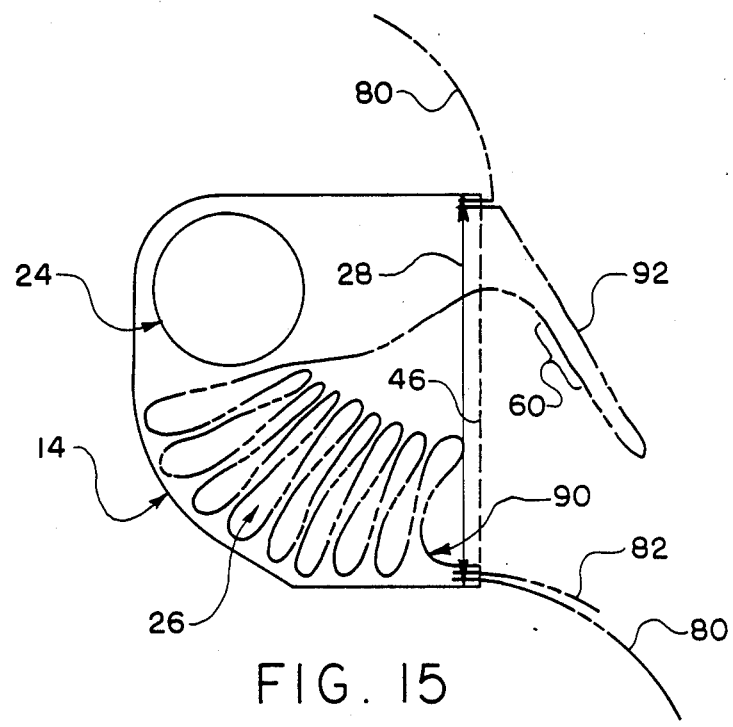
Figure 16:
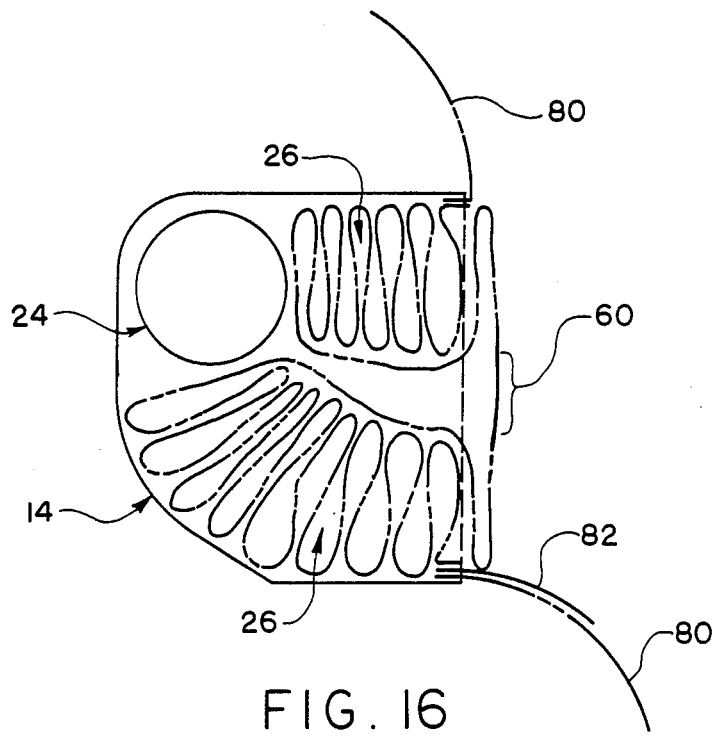

The fourth step is to fold the remaining rectangular layer 92 into the container 14. The layer 92 is folded into approximately five additional folds starting from the other major side of the opening in the container (see FIGS. 15, 16). The folds are continuously pushed toward the other major side of the container opening 28, and the pleats are continued to be pushed into the container on opposite sides of the tether strap. Toward the center of the container, a small portion of bag fabric, which includes the distal segment 60, is left in front of the tether strap (see FIGS. 2A, 2B, 3).

As the bag is folded into the container, in the manner described above, the bag material, including the side pleats 94, 96 forms into masses on opposite sides of the tether strap 46. The distal segment 60 of the bag is disposed in front of and extends to both sides of the tether strap 46. FIG. 2A illustrates (i) the space inside the container 14 occupied by the masses of bag material and (ii) the orientation of the distal segment 60 of the bag relative to the tether strap 46. FIG. 2B, which is similar to FIG. 2A but with the distal fabric segment omitted, illustrates that folded layers cover portions of the container opening 28 near the longitudinal ends of the tether strap 46, but leave an uncovered central region 57 of the container opening extending across the center of the tether strap 46. That central region 57 communicates directly with the portions of the distal bag segment 60 extending to both sides of the tether strap 46. Thus, as seen from FIGS. 2A, 2B, and 3, the clear space 58 is formed behind the tether strap 46 and communicates the gas generator 24 directly with the portions of the distal fabric segment 60 extending to both sides of the tether strap 46.

Figure 17:
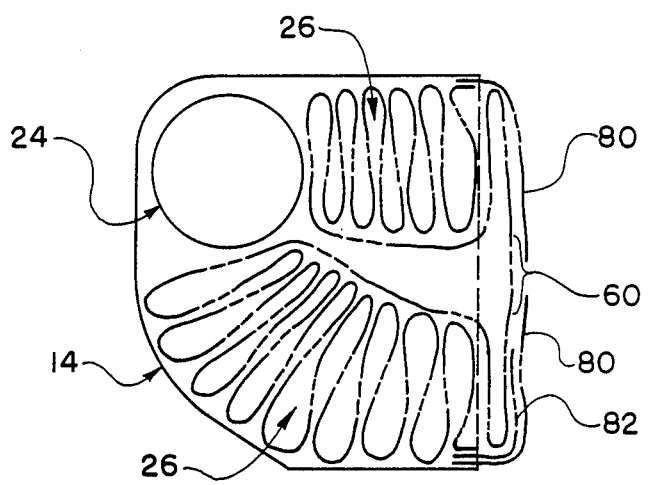

The final step is to fold the interference flaps 80 over the bag (FIG. 17). The interference flaps 80 are designed to prevent the bag from abrading as it is forced out of the container 14. As the interference flaps 80 are folded over the bag, they draw the aspirator flap 82 over a part of the folded bag (see FIG. 17). The aspirator flap 82 is designed to block reverse flow from the bag into the container and to allow the aspirated air to flow into the bag during deployment.

When the gas generator is actuated during a collision, gas flows about the tether strap and impinges directly against the distal segment 60 of the air bag. The pressure of the gas against the distal segment applies pressure to the container cover 16 which causes the container cover to separate into flaps 33, 34. The distal segment 60 is forced through the flaps 33, 34 and into the vehicle compartment. Simultaneously, the rest of the bag is dragged through the flaps 33, 34 and is inflated by the continued flow of gases from the generator 24. During the inflation cycle, the tether strap 46, which is substantially inextensible, operates to maintain the integrity of the container 14, especially in the central portion, and resist bulging of the container. Thus, in the event of an emergency requiring inflation of the air bag, the structure of the present invention is believed to minimize the kind of bulging that can crack a vehicle dashboard. Potentially, therefore, only the module may need to be replaced in the event the air bag is used in an emergency condition.

While the foregoing disclosure depicts the preferred embodiment, there are other ways contemplated for providing the features and advantages of the present invention. For example, the reinforcing member could be a rod made of metal or a synthetic material, rather than a tether strap. Additionally, the reinforcing member could be a separate element that is secured to the container before or after the bag is folded into the container. Moreover, it is believed that additional modifications of the present invention will become apparent to those of ordinary skill in this art.

What is claimed is:

1. Apparatus comprising a vehicle air bag container including a wall defining a cavity for a gas generator and at least part of a vehicle air bag, said wall further defining an opening in said container, the gas generator being actuatable to generate a gas under a pressure in said cavity, said part of said air bag being adapted to be forced out of said cavity through said opening by the pressure of the gas generated when the gas generator is actuated, a reaction member connecting two spaced apart portions of the wall defining the opening and extending across the opening, said reaction member resisting deformation of the container adjacent the opening as the air bag is forced out of the cavity.

2. Apparatus as defined in claim 1, wherein said wall has an inner perimeter defining said opening, said reaction member being connected with two spaced apart portions of the inner perimeter of said wall means so that said reaction member is located internally of said container.

3. Apparatus as defined in claim 2, wherein said opening is substantially rectangular, said reaction member extending across said rectangular opening at a predetermined location along the length of the rectangular opening.

4. Apparatus as defined in claim 3, wherein said predetermined location is selected to enable the reaction member to apply reaction forces to the central portion of the rectangular opening.

5. Apparatus as defined in claim 4, wherein said reaction member is substantially inelastic and is formed of fabric material.

6. Apparatus as defined in claim 5, wherein said reaction member is formed of polyester fabric.

7. Apparatus as defined in claim 3 wherein said part of said air bag maintained in said cavity includes pleated portions on either side of said reaction member and said air bag includes a distal fabric segment disposed partly in front of said reaction member and partly to each side of said reaction member, said reaction member separating the pleated portions and the pleated portions remaining separated between said reaction member and said gas generator to enable gas from said gas generator to impinge directly on the parts of said distal fabric segment extending to each side of said reaction member.

8. Apparatus as set forth in claim 7 wherein said air bag comprises a fabric material with a part defining a rectangular opening, the part of the fabric defining the rectangular opening being adapted for attachment to said inner perimeter of said wall defining the rectangular opening of the container, said air bag being folded into a predetermined configuration and being at least partly disposed in said container in said predetermined configuration, said air bag in said predetermined configuration having a single layer of the fabric material defining said distal fabric segment.

9. Apparatus as set forth in claim 8 wherein said reaction member is connected directly with the air bag fabric material adjacent the rectangular opening therein.

10. Apparatus as defined in claim 9, wherein said reaction member comprises a fabric tether strap sewn to said air bag fabric material adjacent the rectangular opening.

11. Apparatus as set forth in claim 10 wherein a pair of relatively rigid bars engage said air bag fabric material and extend along the length of the rectangular opening in the bag material, said relatively rigid bars being mechanically connected to the inner perimeter of the wall defining said rectangular opening to connect said bag material and said tether strap with said wall.

12. Apparatus as set forth in claim 11 wherein a cover means is disposed over the opening in said container, said cover means defining an additional cavity for the part of the air bag extending outside the container, said cover means having an outer profile designed to match the outer profile of a vehicle dashboard to enable the cover to appear to form a portion of a vehicle dashboard when the apparatus is disposed in a vehicle.

13. Apparatus comprising a vehicle air bag structure including a fabric bag having an opening of a predetermined shape and predetermined dimensions and a tether strap connected with the fabric bag at at least two locations adjacent the opening, said fabric bag having means for enabling the portion of said fabric bag adjacent said opening to be secured to a container for said vehicle air bag structure, and said tether strap extending across the opening in the bag.

14. Apparatus as set forth in claim 13 wherein said tether strap comprises a length of fabric material.

15. Apparatus as set forth in claim 14 wherein said length of fabric material forming said tether strap is substantially inelastic.

16. Apparatus as set forth in claim 15 wherein said fabric bag has a generally cylindrical profile when inflated with a gas, said cylindrical profile comprising a pair of substantially circular side panels and a substantially cylindrical intermediate panel extending between said side panels, said fabric bag opening being disposed in said central intermediate panel of said fabric bag.

17. Apparatus as set forth in claim 16 wherein said opening in said air bag is substantially rectangular.

18. Apparatus as set forth in claim 17 wherein the rectangular opening in said air bag includes a pair of major parallel sides, and wherein said bag material is configured to define longitudinal tubes along both major sides for receiving rigid reinforcing bars.

19. Apparatus as set forth in claim 18 wherein said tether strap is sewn to said bag material.

20. A method of assembling an air bag module, said module including a container with a wall defining a cavity for receiving a gas generator and a portion of an air bag and an opening through which the air bag and a reaction member are inserted into the cavity, said air bag when inflated having a generally cylindrical profile with a pair of circular end panels and a cylindrical central panel extending between the circular end panels, the cylindrical central panel having an opening corresponding in shape to the opening in the container, and the cylindrical central panel having a distal segment diametrically opposed from said opening in the central panel, the method comprising the steps of:

(a) securing the air bag to the container so that their respective openings are aligned and securing the reaction member to the container to extend across a part of the opening in the container;

(b) folding the bag into a predetermined configuration with a pair of outer fabric segments and pleated sections therebetween, the pleated sections being disposed on opposite sides of a center line extending from the opening in the cylindrical central panel to the distal segment;

(c) folding the bag material into the container with the pleated sections on opposite sides of said reaction member and the distal segment directly in front of said reaction member; and (d) applying a cover to the container to maintain the folded bag material therein.

21. A method as defined in claim 20 wherein the step of folding the bag into a predetermined configuration comprises the step of folding the bag so that the pair of outer fabric segments are formed into rectangular configurations, and wherein the step of folding the bag material into the container comprises sequentially folding the outer fabric segments into layers in the container.

22. A method as set forth in claim 21 including the step of securing the reaction member to the bag so that the reaction member extends across part of the opening in the bag, and wherein the step of securing the bag to the container includes the step of simultaneously securing the reaction member to the container.

23. A method as set forth in claim 22 wherein the reaction member comprises a tether strap, and the step of securing the reaction member to the bag comprises the step of sewing the tether strap to the bag material.

24. Apparatus comprising a vehicle air bag structure including a fabric bag having an opening of a pre-determined shape and predetermined dimensions, said opening being dimensioned to allow a flow of gas under pressure through said opening into said fabric bag, said fabric bag being dimensioned to expand to a pre-determined shape when gas under pressure flows through said opening and into said fabric bag, and a tether strap connected with said fabric bag at at least two locations adjacent said opening, said tether strap extending across said opening in said fabric bag, said tether strap adapted to be in a state of tension when gas under pressure flows through said opening and into said fabric bag, to maintain said opening substantially in said pre-determined shape when said fabric bag is secured to an air bag container and gas pressure flows through said opening.

25. Apparatus as set forth in claim 24 wherein said tether strap comprises a length of fabric material.

26. Apparatus as set forth in claim 25 wherein said length of fabric material forming said tether strap is substantially inelastic.

27. Apparatus as set forth in claim 26 wherein said fabric bag has a generally cylindrical profile when inflated with a gas, said cylindrical profile comprising a pair of substantially circular side panels and a substantially cylindrical intermediate panel extending between said side panels, said fabric bag opening being disposed in said central intermediate panel of said fabric bag.

* * * * *